(12) United States Patent
Hawkins et al.

(10) Patent No.: US 7,069,349 B2
(45) Date of Patent: Jun. 27, 2006

(54) IPMI DUAL-DOMAIN CONTROLLER

(75) Inventors: Pete A. Hawkins, San Luis Obispo, CA (US); Clyde S. Clark, Atascadero, CA (US)

(73) Assignee: Intel Corporation, Santa Clara, CA (US)

(*) Notice: Subject to any disclaimer, the term of this patent is extended or adjusted under 35 U.S.C. 154(b) by 740 days.

(21) Appl. No.: 10/044,449

(22) Filed: Jan. 10, 2002

(65) Prior Publication Data

US 2004/0228063 A1  Nov. 18, 2004

(51) Int. Cl.
*G06F 3/00* (2006.01)
*G06F 13/12* (2006.01)

(52) U.S. Cl. ............... 710/15; 710/19; 710/62; 710/2

(58) Field of Classification Search ............ 710/1, 710/2, 5, 8–19, 62–64, 73, 74, 100, 300, 710/305, 306, 311, 312, 104; 709/222–224, 709/217, 219; 713/1, 2
See application file for complete search history.

(56) References Cited

U.S. PATENT DOCUMENTS

| | | | |
|---|---|---|---|
| 6,421,755 B1 * | 7/2002 | Rao | 710/302 |
| 6,496,790 B1 * | 12/2002 | Kathavate et al. | 702/188 |
| 6,519,552 B1 * | 2/2003 | Sampath et al. | 702/183 |
| 2001/0044841 A1 * | 11/2001 | Kosugi et al. | 709/223 |
| 2003/0055955 A1 * | 3/2003 | Cheng et al. | 709/224 |
| 2003/0115397 A1 * | 6/2003 | Hawkins et al. | 710/305 |
| 2003/0130969 A1 * | 7/2003 | Hawkins et al. | 706/15 |

* cited by examiner

*Primary Examiner*—Matthew Kim
*Assistant Examiner*—Joshua D. Schneider
(74) *Attorney, Agent, or Firm*—Kacvinsky LLC (57) ABSTRACT

A computer chassis compliant with the Intelligent Platform Management Interface includes a central baseboard management controller (CBMC) and at least one computer board set. The computer board set includes a microcontroller that operates simultaneously as a satellite management controller to receive system management requests from the CBMC and to provide system management information to the CBMC, and as a local baseboard management controller to receive system management information about the computer board set and to provide the system management information about the computer board set to the computer board set. The computer board set detects a local event, which is entered in a local system event log. The satellite management controller determines if the event was requested by the CBMC, and if so, transmits a corresponding event message to the CBMC. The local baseboard management controller determines if local action is required and performs the local action.

17 Claims, 4 Drawing Sheets

IPMI DUAL-DOMAIN CONTROLLER

BACKGROUND

1. Technical Field

The present invention generally relates to control of a computer chassis. More particularly, the present invention relates to handling of system management information in a computer chassis by a dual domain controller acting simultaneously as a satellite management controller and a baseboard management controller.

2. Discussion of the Related Art

Computer management demands are becoming more detailed as the computers themselves become more complex. Currently, computer management architecture is not very intelligent in how the central processing unit (CPU) manages the resources of the computer. Sensors, field-replaceable units, and circuit boards each have a different way of communicating whether or not it is operating within normal and expected parameters. The CPU monitors these devices by continuously polling each device to determine if there is a problem that needs to be reported, or if a device has been added or removed.

The monitoring performed by the CPU keeps the CPU from performing its primary tasks, such as running the operating system and application software. These monitoring requirements greatly impact the CPU performance as the system grows in size and complexity. Also, the monitoring is performed in a proprietary fashion on most existing computers. In addition, computer purchasers desire to have computers that monitor, analyze, and repair themselves.

In response to the problems of decreased CPU performance and the need for 100% computer availability, multiple computer vendors developed the Intelligent Platform Management Interface (IPMI). In addition, the computer vendors use Inter-Integrated Circuit ($I^2C$) as a hardware-level communication layer between different integrated circuit devices within a system to connect the devices with the CPU.

IPMI is an open standard hardware management interface specification that defines how unique devices can all communicate with the CPU. With IPMI, the CPU makes requests and receives information from an IPMI event log through a baseboard management controller (BMC). The devices communicate in a standard way with the IPMI event log and the CPU only asks what has changed in the event log since the last inquiry.

The intelligence of managing the hardware has moved into the IPMI firmware layer. The CPU software layer now communicates in a standard way to the IPMI firmware. The system scalability is increased because the management intelligence is closer to the managed devices.

The IPMI standard includes the following elements: the Intelligent Platform Management Interface, the Intelligent Platform Management Bus (IPMB), the Intelligent Chassis Management Bus (ICMB), the Baseboard Management Controller (BMC), and the Satellite Management Controller (SMC).

The IPMI standard provides a specification for the controller command sets, including command sets for sensors, event logs, and sensor data record access along with the specification for the data formats. The data forms utilized by IPMI include sensor data records, event log entries, and field replaceable unit (FRU) inventory entries.

The IPMB is the $I^2C$ based, multi-master bus used for intra-chassis communication between the BMC and "satellite" management controllers (SMC). SMCs are management controllers that are distributed on other modules within the system, away from the "central" BMC. The ICMB is a bus used for chassis-to-chassis communication. The BMC manages the interface between the system management software and the platform management hardware, provides autonomous monitoring, event logging, and recovery control, and serves as a gateway between system management software and the IPMB and ICMB.

In a computer chassis, system management security is an issue if a central BMC is connected to SMCs that reside on computer board sets (CBS). Because there is one central BMC and one central event log, each CBS has access to system information about the other CBSs. Ideally, each CBS should have access to system information about itself without this information being visible to other CBSs, while also providing external system management information to the central BMC.

Compact Peripheral Component Interface, also known as CompactPCI® (specification 2.0, revision 3.0, PCI Industrial Computer Manufacturers Group, published Oct. 1, 1999), IPMI CBSs may be designed for a specific slot type (system, peripheral, or busless) or may be designed to operate in any slot type. Typically, the IPMI controller operates as either a BMC when installed in a system slot or as an SMC when in a peripheral or busless slot. However, the controller may be utilized only in one mode at a time; it cannot operate simultaneously as both a BMC and a SMC. Again, system management security is an issue because the CBS internal system management information is visible to other CBSs.

Accordingly, a need exists for a controller to operate as a BMC and SMC simultaneously in order to separate system management access into multiple domains for greater system management security.

DETAILED DESCRIPTION OF INVENTION

Figure 1:
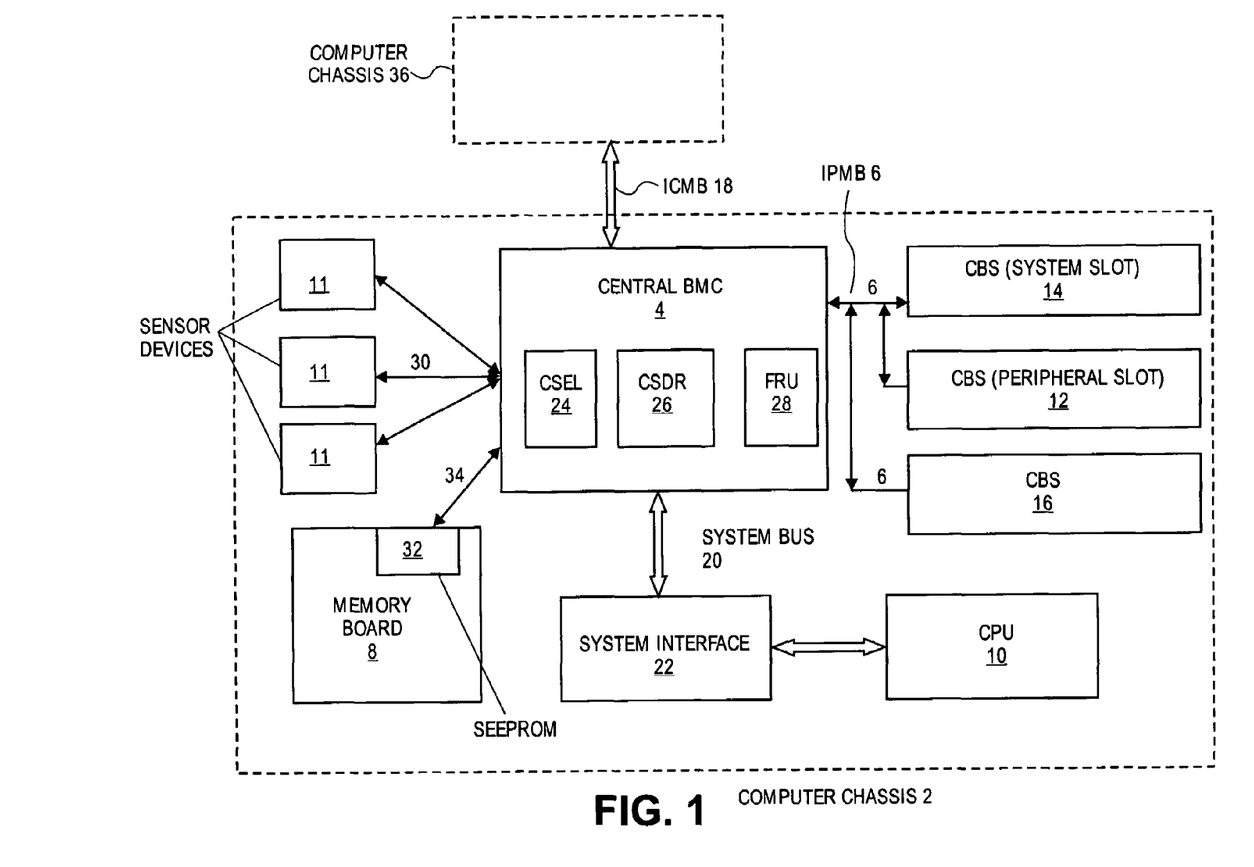
FIG. 1 illustrates a computer chassis utilizing Intelligent Platform Management Interface (IPMI) according to an embodiment of the present invention.

FIG. 1 illustrates a computer chassis 2 utilizing Intelligent Platform Management Interface (IPMI) according to an embodiment of the present invention. A computer may be a web server or file server. A computer may also be an application or control processor as used in telecommunication systems. A computer chassis may be a chassis with one or more computer board sets (CBSs). The computer chassis 2 may include a central baseboard management controller (CBMC) 4, an Intelligent Platform Management Bus (IPMB) 6, a memory board 8, a central processing unit (CPU) 10, shared resources or sensors 11 such as a fan or power supply, and at least one computer board set (CBS) 12 14 16. The CBSs 12 14 16 are configured as dual-domain controllers connected to the computer chassis 2 via a computer chassis board slot. The CBSs 12 14 16 may be connected via a Compact Peripheral Component Interface (CompactPCI) board slot or via other computer bus interface protocols. Illustratively, the board slots may include a CompactPCI system slot, a CompactPCI peripheral slot, or a compatible node slot. The CBS may be a computer in itself, an application processor, or the like.

The CBS may be a single board computer installed in one board slot. Alternatively, the CBS may be a plurality of boards connected to each other installed in one board slot. For example, the CBS may be a set of piggybacked boards installed in one board slot. In another embodiment of the invention, the CBS may be a plurality of boards connected to each other and installed in multiple board slots. In even another embodiment of the invention, the CBS may be a device, such as a power supply or fan frame, connected to an integrated circuit board.

The computer chassis 2 is implemented in accordance with the Intelligent Platform Management Interface (IPMI). IPMI messaging uses a request/response protocol, and IPMI request messages are commonly referred to as commands. Standardized commands are defined in the IPMI specification (current version 1.5, revision 1.0, Feb. 21, 2001, by Intel, Hewlett-Packard, Dell, and NEC). The use of a request/response protocol facilitates the transfer of IPMI messages over different transports like the IPMB, ICMB, or any well-known system interfaces. IPMI commands are grouped by functionality. Illustrative command groups include sensor and event commands; application commands for controller functionality; chassis control and status commands; bridge commands; storage commands for non-volatile storage access; and firmware transfer commands. This list is merely illustrative.

Event messages encapsulate key event info like sensor type, event type, event transition, and event generator. Event messages are combined with the sensor data records information to allow for in-depth event analysis and allows the application to identify the entity and field replaceable unit associated with the event along with the sensor.

Sensor data records (SDRs) are also a part of the IPMI architecture. SDRs describe the population of sensors by providing such information as location, ID, access method, type, unit of measurement and reading type of the sensor. Illustrative sensor types include temperature, voltage, and processor, while illustrative units of measurement may include volts, amps, or bytes per second. The SDRs also guide software in presenting sensor information like normal reading ranges, tolerance and accuracy along with the sensor ID string. In addition, the SDRs identify the entity or the Field-Replaceable Unit (FRU) associated with each sensor. In one embodiment of the invention, the SDRs hold default threshold values and event generation settings for sensors and management controllers; the BMC initializes the sensors and management controllers by sending the threshold values or event generation settings to the devices. Alternatively, SDRs may describe the number and types of devices connected to IPMB 6, and the location and type of field replaceable unit (FRU) devices.

The heart of the IPMI architecture is the central BMC (CBMC) 4. The CBMC 4 manages the computer chassis 2. The CBMC 4 manages the interface between system management software and the platform management hardware. The CBMC 4 also provides autonomous monitoring, event logging, recovery control, and serves as a gateway between system management software and both the Intelligent Platform Management Bus (IPMB) 6 and the Intelligent Chassis Management Bus (ICMB) 18. The CBMC 2 is connected to a system bus 20 on the computer chassis motherboard through a system interface 22.

In one embodiment of the invention, the interface to connect the CBMC 4 with the system bus 20 is a 8742 keyboard controller-style interface. Alternatively, the system interface 22 may be a server management interface chip or a block transfer interface.

The CBMC 4 may be located on the motherboard of the computer chassis 2. Alternatively, the CBMC 4 may be installed in the system board slot of the computer chassis 2. If a CBS with dual-domain controller functionality is installed in the system board slot of the computer chassis 2, it may operate as the CBMC 4 of the computer chassis 2. This example is illustrative; a dual-domain controller may use other factors to determine to operate as the CBMC.

The CBMC 4 may include a centralized, non-volatile storage system as illustrated in FIG. 1. Alternatively, the CMBC 4 may be connected to the non-volatile storage system. The non-volatile storage system may include a central system event log (CSEL) 24, a central sensor data record (CSDR) repository 26, and a baseboard field-replaceable unit (FRU) information module 28.

Event messages from sensor devices or management controllers are transmitted to the CSEL 24 for storage. The CSEL 24 is, for example, a centralized non-volatile storage for time-stamped event messages. Illustratively, the event messages are compact 16-byte event records with the message format tied to the sensor representation and access. The CPU 10 asks the CBMC 4 for system management information updates via the system management software and the CBMC 4 retrieves the system management information from the CSEL 24.

The CSEL 24 is managed by the CBMC 4 and ensures that "post-mortem" logging information is available should a failure occur that disables the computer CPU 10. A set of IPMI commands allows the CSEL 24 to be read and cleared and also for events to be added to the CSEL 24. If an event is to be added to the CSEL 24, it is referred to as an event message and illustratively may be sent to the CBMC 4 via the IPMB 6.

The central SDR repository 26 is, for example, a centralized non-volatile storage for sensor data records. The baseboard FRU information module 28 is, for example, a non-volatile storage for FRU information regarding the baseboard FRUs. In addition, FRU information may be stored in non-volatile storage located on other devices or modules.

The Intelligent Platform Management Bus (IPMB) 6 is a standardized bus and protocol for extending management control, monitoring, and event delivery within the chassis. The IPMB 6 is routed between major system modules in the computer chassis 2. The IPMB 6 is used for communication to and between management controllers, e.g., CBSs 12 14 16.

The motherboard where the CBMC 4 is located or the CBSs with dual-domain controllers 12 14 16 are located, may include at least one private management bus 30. The private management bus 30 may be used to connect various sensors to the IPMI controllers. The private management bus 30 is private to the specific controller to which it is connected, and therefore, only that controller knows about the private management bus 30. Thus, only the controller has the ability to directly access the sensors on the private management bus. In one embodiment of the invention, the private management bus 30 may be a $I^2C$-based, single master bus.

In one embodiment of the invention, computer chassis shared sensors 11 like fans and power supplies may communicate directly to the central BMC 4 via a private management bus 30. Thus, only the CBMC 4 has the ability to directly access the shared sensors. Before a system utilizes a sensor 11 to gather system performance information, the sensor 11 may need to be initialized. The sensor initialization information is located in the CSDR repository 26. The CBMC 4 directs the CSDR repository 26 to provide the sensor initialization information to the sensor 11 at startup. In another embodiment of the invention, the CBMC 4 directs that sensor initialization information may be provided to CBSs 12 14 16 to initialize the sensors that reside on the CBSs 12 14 16. The sensor information is collected on an ongoing basis under the control of the CBMC 4 as the CBMC monitors the sensors 11 and is stored in the CSEL 24 as an event message. Illustrative sensor information includes board temperature, system voltages, and fan status.

Baseboard FRU information is also provided to the CBMC 4 and stored in the baseboard FRU storage 28. The FRU information may either be provided via management controllers or serial electrically erasable programmable read-only memories (SEEPROMs) 32. For example, by having a SEEPROM involved, it allows the subsystem not to have a management controller as part of the device. If the FRU information is provided utilizing SEEPROMS 32, the SEEPROMS 32 communicate with the CBMC 4 via a private management bus 34. For example, the SEEPROMS 32 on the system memory board 8 may communicate with the CBMC 4 via the private management bus 34. Illustratively, FRU information includes information such as serial number, part number, model or asset tag. The FRU information may be available at any time, even when the system is powered down, and is independent of system BIOS, the system CPU, the system software or operating system. This arrangement allows information to be retrieved via "out-of-band" interfaces, such as the ICMB 18 and other devices connected to the IPMB 6.

IPMI supports the extension of platform management by connecting additional management controllers within the computer chassis 2 using the IPMB 6, which is routed between major system modules and is used for communication to and between management controllers. In one embodiment of the present invention, management controllers are implemented on computer board sets (CBSs) 12 14 16. The CBSs 12 14 16 are connected to the computer chassis 2 via module slots. Illustratively, the slots conform to the PCI interface or a Peripheral Component Interface Manufacturer's Group (PICMG®) 2.16 (specification under development) compliant interface, although other interfaces known in the art are acceptable. Because the CBSs 12 14 16 are located in slots away from the CBMC 4, they are sometimes referred to as satellite management controllers (SMCs). The system may have one SMC/CBS or multiple SMCs/CBSs.

According to an embodiment of the present invention, each CBS operates simultaneously as both a satellite management controller (SMC), to receive requests from, and to transmit system management information to, the CBMC 4, and as a local baseboard management controller (LBMC), to receive and to distribute CBS system management information internally. An example of CBS system management information is the local CPU temperature, the status of LEDs on the CBS, or whether a specific chip is in operating within proper temperature guidelines. A CBS that operates simultaneously both as a SMC and a LBMC may be referred to as a dual-domain controller.

In one embodiment of the invention, the computer chassis 2 may contain multiple CBSs 12 14 16 operating as dual-domain controllers. In another embodiment of the invention, CBSs 12 14 16 operating as a dual-domain controller may be located in a separate computer chassis 36; the multiple chassis may be connected by the ICMB 18 and may be controlled by the CBMC 4.

Figure 2:
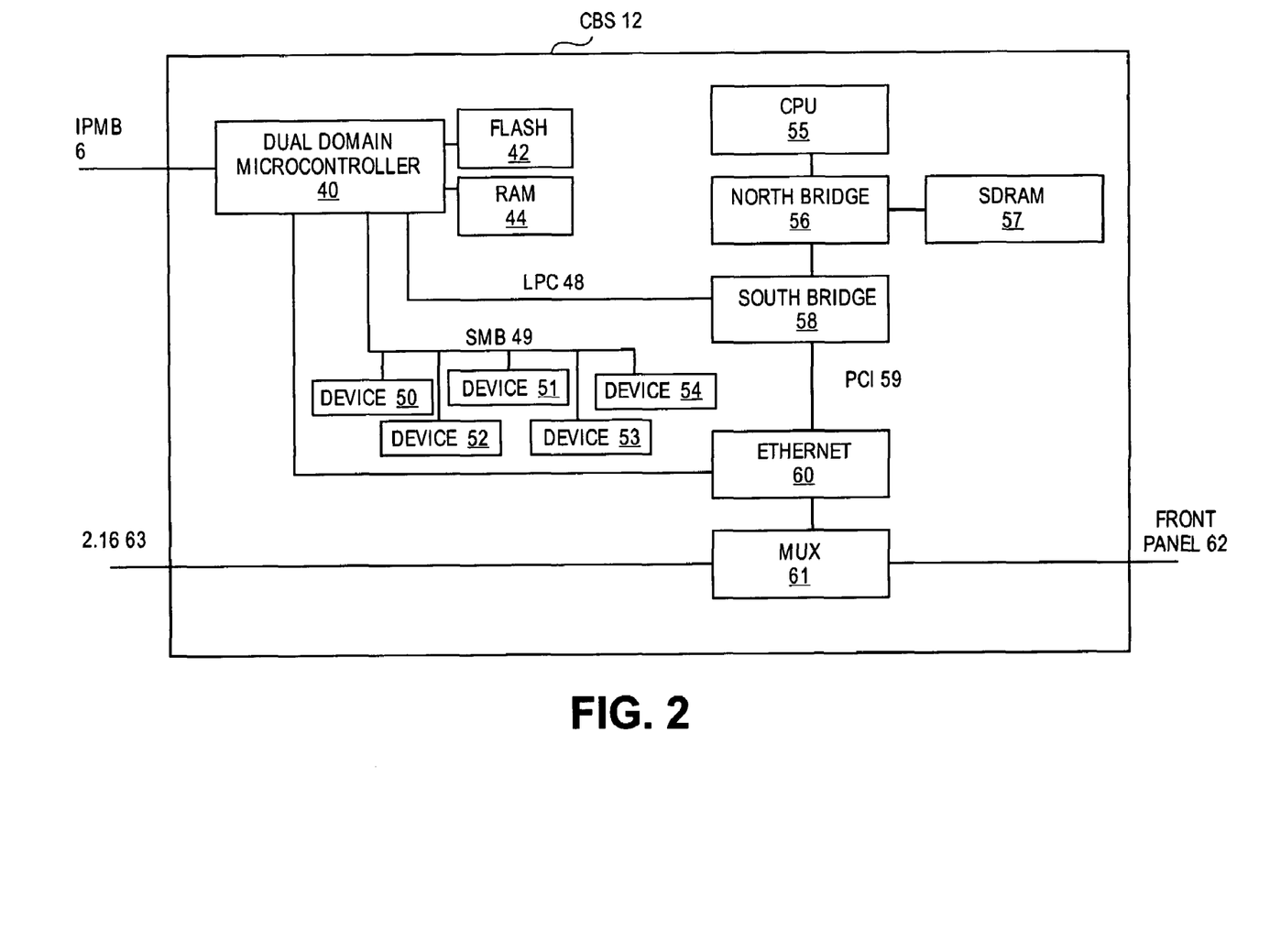
FIG. 2 illustrates a computer board set (CBS) architecture according to an embodiment of the present invention.

FIG. 2 illustrates a computer board set (CBS) architecture including a dual-domain microcontroller according to an embodiment of the present invention. The CBS 12 may include a dual-domain microcontroller 40, a flash memory device 42, a RAM device 44, a local IPMB 6, a low-pin count (LPC) bus 48, a SMB bus 49, a group of devices/sensors 50–53 and a FRU information device 54, a local CPU 55, a North Bridge 56, and a synchronous dynamic random access memory (SDRAM) 57. The North Bridge 56 handles many system operation functions in the CBS 12. In addition, a CBS 12 may also include a South Bridge 58, a PCI bus 59, an Ethernet Controller 60, an Ethernet Multiplexer 61, and a front panel Ethernet access port 62. The Ethernet Multiplexer 61 selects whether the Ethernet Port 60 is routed to the front panel access port 62 or the PICMG 2.16 port 63. The South Bridge 58 handles many input/output functions for the CBS 12.

Figure 3:
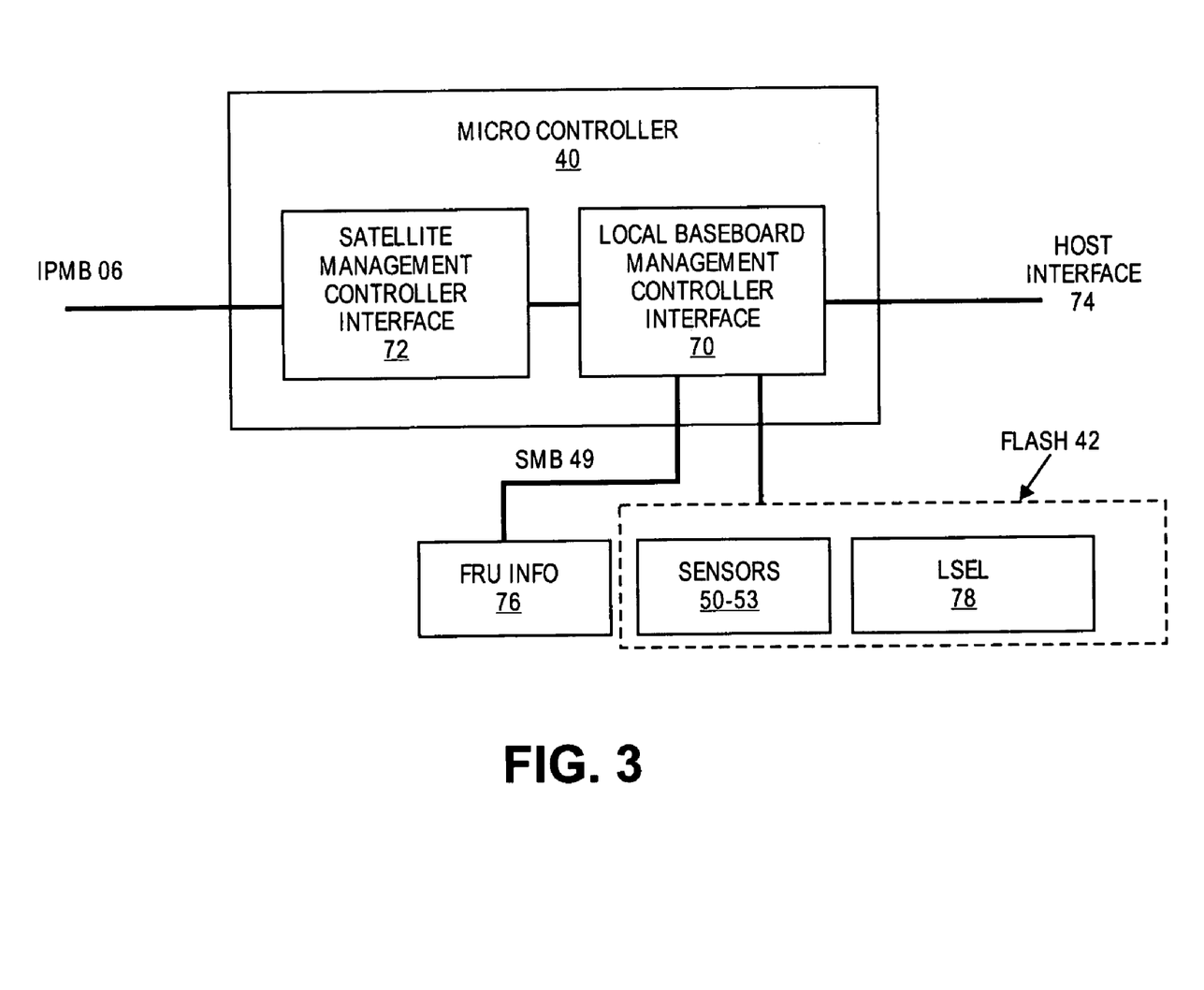
FIG. 3 illustrates a dual-domain controller according to an embodiment of the present invention.

FIG. 3 illustrates a dual-domain microcontroller 40 according to an embodiment of the present invention. The dual domain microcontroller 40 includes a local baseboard management controller (LBMC) interface 70, for transmitting information to the host CPU over the host interface 74 and for collecting information from the sensors 50–53, and a SMC interface 72, for transmitting system management information from the CBS 12 to the CBMC 4 over the IPMB 6 and for receiving requests for information from the CBMC 4 over the IPMB 6. The host interface 74 may be a low-pin count (LPC) bus 48. Alternatively, it may be an industry-standard architecture (ISA) bus, or any other well-known bus technology utilized to connect components on the CBS 12.

This configuration allows for system management access to be separated into multiple domains for greater system management security. The LBMC interface 70 provides internal system management information to the local CPU 55 and is not involved in providing external system management information to the CBMC 4. The SMC interface is a separate logical entity and provides limited access to the system management features of the CBS. Often the SMC interface only handles event messages, like platform event messages, that are requested by the CBMC 4. Therefore, the LBMC interface 70 and the SMC interface 72 are in separate domains. Other CBSs cannot view the internal first CBS system management information because these other CBSs may only be connected to the first CBS through the SMC interface 72 and the SMC interface 72 has limited access capability, often only responding to event message requests from the CBMC 4.

The SMC interface 72 and the LBMC interface 70 may be implemented in firmware resident on the CBS 12. In one embodiment illustrated in FIG. 2, the SMC interface 72 and LBMC interface 70 may be implemented by and located in the flash memory 42. In another embodiment, the SMC interface 72 and LBMC interface 70 may be located and implemented in an application specific integrated circuit (ASIC) resident on the CBS 12. Alternatively, the SMC interface 72 and the LBMC interface 70 may be hardwired into the CBS 12. Additional locations for the SMC interface 72 and the LBMC interface 70 include read-only memory (ROM), programmable read-only memory (PROM), erasable programmable read-only memory (EPROM), electrically erasable programmable read-only memory (EE- PROM), and SEEPROM. The RAM 44, illustrated in FIG. 2, may be used for debugging and operational functions of the dual domain controller.

The SMC interface 72 receives event message requests from the CBMC 4 via the IPMB 6. In an embodiment of the invention where the CBS is located in another computer chassis 36, the SMC interface 72 in the other computer chassis 36 receives event messages from the CBMC 4 via the ICMB 18. The SMC interface 72 accepts the event message request from the CBMC 4, gathers the information from the appropriate device, such as a sensor 11, packages the information in the appropriate transmission format and transmits the event message with the information over the IPMB 6 to the CBMC 4. If the SMC interface 72 is located in another computer chassis 36, the information is sent over the ICMB 18.

The LBMC interface 70 receives input from the local FRU information module 70, a plurality of local sensors 50–53 and the non-volatile local system event log (LSEL) 78, as illustrated in FIG. 3. The LBMC interface 70 monitors the local sensors 50–53. In an embodiment of the invention, the LSEL 78 is located in the Flash memory 42 as illustrated in FIG. 2. The LSEL 78 operates in a similar fashion to the CSEL 24 with the main difference being that the LSEL 78 only stores event messages relevant to the local operation of the CBS 12 or generated by the CBS's sensors 50–53. The LBMC interface 70 only accepts message requests from the local CPU 55 for information from the LSEL 78. The LBMC interface 70 does not respond to requests from the CBMC 04.

The LBMC interface 70 is connected to sensors 50–53 that are resident on the CBS 12 as illustrated by FIG. 3 and FIG. 2 where the LBMC interface 70 is connected with the sensors 50–53 located via the SMBus 49. The SMBus 49 is, for example, a two-wire serial bus designed for system management. SMBus may be the private management bus for the controller, as illustrated in FIG. 2, and multiple SMBuses may be located on an CBS 12. Alternatively, the bus may be an I²C bus or any other type of connection suitable for connecting sensors to a controller. The LBMC interface 70 controls the collection of event messages from the plurality of sensors and transfers this information to the LSEL 78 for storage.

The local FRU information module 76 is utilized to store information about the CBS 12, the CBS is the Field Replaceable Unit (FRU) in this case, as illustrated in both FIG. 2 and FIG. 3. Exemplary information includes part numbers, vendor model number, or an asset tag for the CBS 12. In FIG. 3, the dual-domain controller 40 communicates via a 2-wire serial bus (SMBus) to the FRU information module 76. In another embodiment of the invention, the dual-domain controller 40 may communicate via the I²C bus.

As illustrated in FIGS. 2 and 3, the LBMC interface 70 of the dual-domain controller 40 may provide internal system management information to the local CPU 55 via the LPC bus 48. Alternatively, the LBMC interface 70 may provide internal system management information via another local bus technology. In one embodiment of the invention, system management information may be transmitted from the dual domain controller via LMBC interface 70 along the LPC bus 48 to the South Bridge 58. The South Bridge 58 handles many input/output functions for the CBS 12. Because the system management information is to be sent to the local CPU 55 and not to be output from a input/output device on the CBS 12, the South Bridge 58 transfers the information to the North Bridge 56, which handles many system operation functions for the CBS 12. The North Bridge 56 transmits the requested system management information to the SDRAM 57. The local CPU 55 then accesses the information from the SDRAM 57. The North Bridge 56 may also transmit the requested system management information directly to the local CPU 55.

A CBS 12 may also include the ability for a user to remotely communicate with the dual-domain controller 40. In a computer chassis 02, multiple software applications may have ownership over the CBSs. For example, a CBS may be a database server and the database application program may need to access the database server for system management information, i.e., board health information. As illustrated in FIG. 2, an Ethernet backplane 2.16 (PICMG 2.16 IP Backplane for Compact PCI) connector 63 or a front panel Ethernet connector 62 may be used to remotely communicate with the LBMC interface 70 of the dual-domain controller 40. The user may select which connector is to be utilized to remotely communicate with the LBMC interface 70 by configuring a Ethernet multiplexer 61. The Ethernet channel is established between one of the Ethernet connectors 62, 63 and the Ethernet controller 60. The connection between the dual domain controller 40 and the Ethernet controller 60 may be a SMBus, a I²C bus, or another appropriate connection. Alternatively, the Ethernet controller 60 may communicate via a PCI bus 59 to the South Bridge 58. From the South Bridge 58, the communication may be routed via a LPC bus 48 to the dual-domain controller 40.

Figure 4:
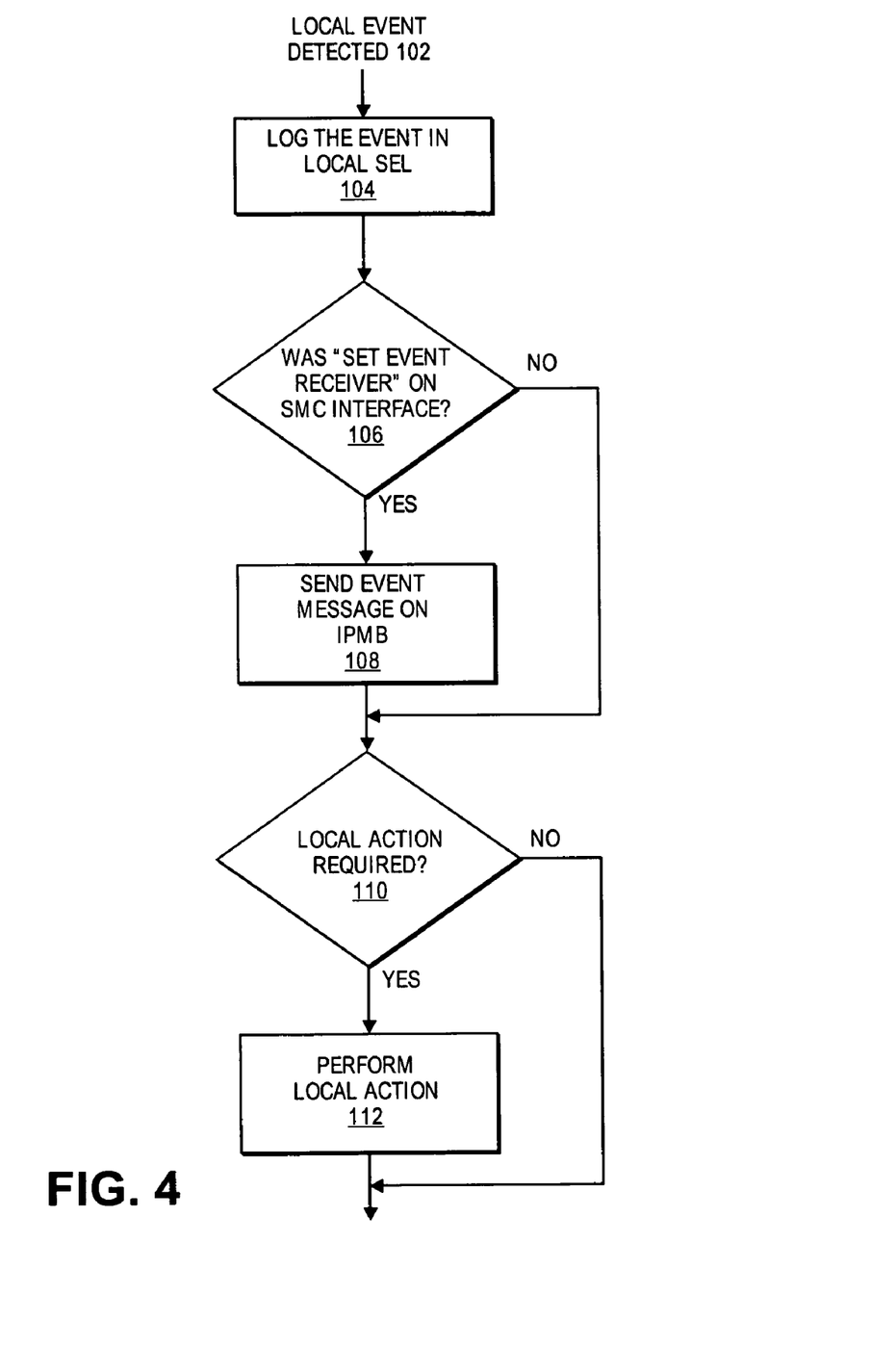
FIG. 4 illustrates a flowchart of a method a dual-domain controller utilizes to determine if an event message is utilized by an on-board baseband management controller interface or an on-board satellite management controller interface according to an embodiment of the present invention.

FIG. 4 illustrates an event message flow in a CBS 12 with a dual-domain microcontroller 40 according to an embodiment of the present invention. A local event is detected 102 by the LBMC interface 70. For example, the event may be a reading from a sensor 50–53 along with an event type. The information is logged 104 into the LSEL 78 under command of the LBMC interface 70. The information is analyzed 106 to determine if a command has been issued by the CBMC 4 to send event messages for that sensor 50–53. The command issued by the CBMC 4 may be a "set event receiver" command. A "set event receiver" command is issued by the CBMC 4 in order to instruct the SMC interfaces 72 to send event messages to the CBMC 4. The command specifies a destination to which to send the information, e.g., the CBMC, 4, and also specifies the particular event and sensor for which a reading is requested. In one embodiment of the invention, the event message is analyzed 106 to determine if the CBMC 4 has issued a "set event receiver" command to instruct the SMC interface 72 to send the event message to the CBMC 4. If the information is to be sent to the CBMC 4, it may be sent 108 over the IPMB 6 to the CBMC 4.

If the information has not been requested by the CBMC 4 or after the information has been sent over the IPMB 6 to the CBMC 4, the LBMC interface 70 determines 110 if local action is required. An example of local action may be adjusting the local CPU's clock speed based on the temperature. Another example of local action is beeping a speaker when anything being monitored goes out of specification. If local action is required, the LBMC interface 70 may, illustratively, send out 112 an event message with an updated sensor reading to the local CPU 55. If local action is not required, the LBMC interface 70 does not perform any task and the system processes the next event.

The present invention provides a system and method of providing increased security in a computer chassis that are compliant with IPMI. A computer chassis includes a central baseboard management controller, a CPU, and at least one computer board set operating as a management controller. The management controller is a dual-domain controller that operates both as a satellite management controller for the computer chassis and a baseboard management controller for the computer board set. This configuration allows each CBS to access system information about itself without visibility to other CBSs or shared resources, while at the same time providing system management information about each CBS to the central BMC.

While the description above refers to particular embodiments of the present invention, it will be understood that many modifications may be made without departing from the spirit thereof. The accompanying claims are intended to cover such modifications as would fall within the true scope and spirit of other embodiments of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. A dual-domain microcontroller to communicate secure system management information, comprising: a satellite management controller to receive a request for system management information and to provide system management information of a computer board set through a bus interface; and a baseboard management controller to receive the system management information from the computer board set and to transmit the system management information to the computer board set through a computer board set bus interface, wherein the satellite management controller and the baseboard management controller operate simultaneously on the computer board set.

2. The dual-domain microcontroller of claim 1, wherein the satellite management controller and the baseboard management controller are both implemented in an application-specific integrated circuit (ASIC) located on the computer board set.

3. The dual-domain microcontroller of claim 1, wherein the satellite management module and the baseboard management module are both implemented in a flash memory on the computer board set.

4. A computer board set, comprising: a central processing unit; and a dual-domain microcontroller operating simultaneously as a satellite management controller to receive a request for system management information and to provide system management information of the computer board sets through a bus interface, and as a local baseboard management controller to receive the system management information from the computer board set and to provide the system management information to the central processing unit through a computer board set bus interface.

5. The computer board set of claim 4, where the bus interface is an Intelligent Chassis Management Bus (ICMB).

6. The computer board set of claim 4, wherein the computer board set bus interface is a low-pin count bus.

7. The computer board set of claim 4, wherein the computer board set bus interface is an industry standard architecture (ISA) bus.

8. A Intelligent Platform Management Interface (IPMI) compliant computer chassis, comprising: a computer central processing unit; and a computer board set having a dual-domain controller, wherein the dual-domain controller operates as a central baseboard management controller to collect system management information from the IPMI compliant computer chassis and to provide system management to the computer central processing unit through a bus interface.

9. The computer chassis of claim 8, wherein the bus interface is an Intelligent Chassis Management Bus (ICMB).

10. A Intelligent Platform Management Interface (IPMI) compliant computer chassis, comprising: a computer central processing unit; and a central baseboard management controller to monitor the IPMI compliant computer chassis, to make requests for system management information from at least one computer board sets, to receive system management information from the at least one computer board sets, and to provide the system management information to the computer central processing unit, wherein a computer board set includes a dual-domain controller to operate simultaneously as a satellite management controller to receive a request for the system management information and to provide the system management information of the computer board set through a bus interface to the central baseboard management controller, and as a local baseboard management controller to receive the system management information from the computer board set and to provide the system management information to the computer board set.

11. The computer chassis of claim 10, wherein the computer board set is a computer chassis motherboard.

12. The computer chassis of claim 10, wherein the computer board sets is installed in a computer chassis system slot.

13. The computer chassis of claim 10, wherein the computer board set is installed in a computer chassis expansion slot.

14. The computer chassis of claim 13, wherein the computer chassis expansion slot is a computer chassis peripheral slot.

15. A network of Intelligent Platform Management Interface (IPMI) complaint computer chassis, comprising: a first computer chassis including a central baseboard management controller to monitor the IPMI compliant computer chassis, to make requests for system management information from a computer board set, and to receive the system management information from the computer board set; and a second computer chassis including a computer board set having a dual-domain controller operating simultaneously as a satellite management controller to receive a request for the system management information and to provide the system management information of the computer board set through an Intelligent Chassis Management Bus (ICMB) to the central baseboard management controller, and as local baseboard management controller to receive the system management information from the computer beard set, and to provide the system management information to the computer board set, wherein the first computer chassis is connected to the second computer chassis via the ICMB.

16. The network of computer chassis of claim 15, wherein the satellite management controller and the baseboard management controller are both implemented in flash memory on the computer board set.

17. The network of computer chassis of claim 15, wherein the satellite management controller and the baseboard management controller are both implemented in an application-specific integrated circuit (ASIC) on the computer board set.

* * * * *

UNITED STATES PATENT AND TRADEMARK OFFICE
CERTIFICATE OF CORRECTION

PATENT NO. : 7,069,349 B2 Page 1 of 1
APPLICATION NO. : 10/044449
DATED : June 27, 2006
INVENTOR(S) : Hawkins et al.

It is certified that error appears in the above-identified patent and that said Letters Patent is hereby corrected as shown below:

In column 10, line 50, in claim 15, delete "beard" and insert -- board --, therefor.

Signed and Sealed this

Sixteenth Day of October, 2007

JON W. DUDAS
*Director of the United States Patent and Trademark Office*